(12) United States Patent
Lockett

(10) Patent No.: US 6,579,816 B2
(45) Date of Patent: Jun. 17, 2003

(54) MULTI-PURPOSE ABSORBENT AND SHRED-RESISTANT SHEET MATERIAL

(75) Inventor: Nicole Alisa Renee Lockett, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 200 days.

(21) Appl. No.: 09/770,690

(22) Filed: Jan. 26, 2001

(65) Prior Publication Data

US 2002/0136871 A1 Sep. 26, 2002

(51) Int. Cl.$^7$ ............... B32B 5/16; D04H 1/00; D04H 3/00
(52) U.S. Cl. ............... 442/417; 442/394; 428/327; 428/131; 428/137; 428/138; 428/911; 269/289; 604/358; 604/367; 604/374
(58) Field of Search .................. 442/394, 417; 428/327, 131, 137, 138, 911; 269/289; 604/358, 367, 374

(56) References Cited

U.S. PATENT DOCUMENTS 3,753,826 A    8/1973   Plummer
3,937,648 A    2/1976   Huebner et al.
6,383,614 B1 * 5/2002   Carson et al. ............... 428/206

FOREIGN PATENT DOCUMENTS

| EP | 0 237 665 | 9/1987 | |
| EP | 0873 976 | 10/1998 | |
| GB | 1 130 331 | 10/1968 | |
| WO | WO 02/28577 A2 * | 4/2002 | ........... B23B/27/00 |

* cited by examiner

Primary Examiner—Elizabeth M. Cole
Assistant Examiner—Norca L. Torres
(74) Attorney, Agent, or Firm—Peter D. Meyer

(57) ABSTRACT

A shred-resistant and cut-resistant absorbent sheet material including an absorbent substrate and cut-resistant particles discontinuously distributed through the substrate. The absorbent substrate can comprise cellulosic material and the particles comprise polymeric materials having an average size of at least about 100 nanometers, and most preferably between 100 nanometers and 1000 nanometers. In one embodiment, the particles are provided in an amount of between about 10 percent to about 50 percent by weight of the sheet. The sheet material can be made using typical paper making processes. Heat and/or pressure are applied to the sheet material to cause the particles to at least partially flow, so as to bond to the absorbent substrate. The sheets can be provided as a layered structure with a slip-resistant base for home use in the preparation of foodstuffs.

14 Claims, 5 Drawing Sheets

MULTI-PURPOSE ABSORBENT AND SHRED-RESISTANT SHEET MATERIAL

FIELD OF THE INVENTION

The present invention relates to sheet materials which are disposable and suitable for protecting a supporting surface from various articles and/or substances placed thereon. The present invention further relates to such sheet materials which are also capable of absorbing and/or containing various liquids which may be carried by or exuded from such various articles and/or substances and protecting the supporting structure from these liquids.

BACKGROUND OF THE INVENTION

Sheet-like materials for use in protecting objects or substances from a supporting surface, and/or protecting supporting surfaces from objects or substances, are well known in the art. Such materials can be utilized to provide a permanent form of protection, but most commonly are situation- or task-oriented and are only required or utilized for a limited period of time and then disposed of.

Protective materials having durability, such as cut-resistance, shred-resistance and/or wear resistance have been used for many applications. For instance, protective materials can be used as cutting boards to cover countertops during food preparation, such as when cutting meats or vegetables for cooking. Such protective materials can protect the food item from contacting contaminants which may reside on the support surface, such as a countertop. In addition, such materials can also protect the support surface from physical damage from a cutting tool, as well as from contamination from the food item being prepared.

However, many materials which are protective are not absorbent. For instance, a rigid plastic cutting board will not absorb juices from food items, and these juices may run off the cutting board and soil the countertop or support surface. In addition, many such materials are not flexible, and thus are not easily stored, manipulated, and disposed. Also, because many rigid cutting boards are not intended to be disposed after use, they require cleaning after each use.

For this reason, many materials which are highly cut-, shred-, and abrasion resistant are less than desirable due to the lack of flexibility and conformability typically inherent with such materials.

The reverse is also true, as many materials, such as paper-like materials, can exhibit high absorbency, flexibility, and disposability. However, such materials typically lose a significant amount of strength when wet, and thus cannot adequately protect a support surface from cutting forces. Also, such materials are not typically shred-resistant and thus, if used as a cutting board, particles from the material may transfer to the food item being prepared.

Thus, the consumer is faced with a paradox in selecting an appropriate sheet material for use in such a food preparation scenario. Sheet materials which are comparatively high in absorbency, such as paper-based materials, typically are comparatively low in shred- and cut-resistance in a wetted state, while those which are comparatively high in cut-resistance, such as plastic sheet materials, are comparatively low in absorbency.

For this reason, it would be desirable to provide such a sheet material which, while durable in use, may be so readily and economically manufactured so as to be disposed of after use.

In recognition of these issues, certain composite and/or laminate materials have been developed which combine components exhibiting each of the desirable properties into a coherent structure with overall properties generally intermediate to those of each material separately. While such materials may be suitable for certain applications, the points or regions of joinder between diverse materials frequently become points or regions of vulnerability to detachment when the sheet material is subjected to cutting or abrasion forces or repeated flexing under in-use conditions.

Accordingly, it would be desirable to provide multiple diverse properties such as cut resistance, abrasion resistance, and flexibility in a unitary material structure. It would also be desirable to provide such a material which is durable in use. It would further be desirable to provide such a material which may be readily and economically manufactured so that it can be disposed of after a single use, if so desired.

Polymeric fibers have previously been utilized as a binder and strengthening agent in paper structures. Typically, in such paper structures, fibers made from hydrophobic polymers are added to paper fluff during paper formation. During drying of the mixture, the polymeric fibers flow and coat the surrounding paper fibers locking the paper fibers into the structure and significantly reducing the overall absorbency of the resulting structure. While the amount of polymer fiber could be reduced from the mixture to increase absorbency, such a solution compromises the cut-resistance and shred-resistance of the structure. Thus, one problem with such structures is that the amount of polymer fibers required to achieve adequate cut-resistance and/or shred-resistance significantly reduces the absorbency of the structure.

Accordingly, it would be desirable to provide a sheet material which is both comparatively high in absorbency and comparatively high in shred- and cut-resistance. It is also desirable to provide such a material that is also relatively thin, light, and flexible so as to be readily disposable, and easily dispensed, stored, and manipulated. In addition, it is desirable to provide such sheet materials which, while durable in use, can be economically manufactured so as to justify their disposal after each use.

OBJECTS OF THE INVENTION

It is an object of the present invention to obviate the above-described problems.

Another object of the present invention is to provide a disposable and protective cutting sheet with a substantially smooth cutting surface.

It is a further object of the present invention to provide a sheet material that is light-weight, absorbent, cut-resistant, and shred-resistant.

Yet another object of the present invention is to provide a sheet material that can be used to slice food items while resisting wear from the cutting tool and absorbing juices from the food item.

A further object of the present invention is to provide a sheet material that is resistant to shredding and can absorb significant amounts of liquid produced by food items.

Another object of the present invention is to provide a cut-resistant and absorbent sheet material that is readily disposable.

Yet another object of the present invention is to provide a cut-resistant and absorbent, sheet material that is easily foldable.

A further object of the present invention is to provide an absorbent, cut- and shred-resistant sheet material that does not have a plastic-like appearance.

It is another object of the present invention to provide a protective and absorbent sheet material that can provide an indication of whether it has already been used.

SUMMARY OF THE INVENTION

The present invention encompasses a multi-purpose sheet material comprising a web of absorbing fibers. The web has a polymer containing layer comprising discontinuous, heat-bonded particles. The particles have an average diameter of from about 100 nanometer to about 1000 nanometer. The web comprises of from about 0.5 g/m² to about 75 g/m² of heat-bonded particles and, has a dry basis weight of from about 200 lb/3000 ft² to about 400 lb/3000 ft².

The present invention also encompasses a method for making a multi-purpose sheet by forming a web of absorbent fibers with a dry basis weight of from about 200 lb/3000 ft² to about 400 lb/3000 ft² and applying a polymeric material comprising heat bondable particles having an average diameter of from about 100 nanometer to about 1000 nanometer. The web is then heated until the polymeric material melts and then subsequently cooled.

BRIEF DESCRIPTION OF THE DRAWINGS

While the specification concludes with the claims particularly pointing out and distinctly claiming the invention, it is believed that the same will be better understood from the following description of preferred embodiments, taken in conjunction with the accompanying drawings in which:

DETAILED DESCRIPTION OF THE INVENTION

To achieve the above-noted objectives, a cut- and shred-resistant and absorbent sheet, is provided herein. The sheet comprises a web of absorbing fibers containing a polymer layer formed by discontinuous heat bonded particles having an average diameter of from about 100 nanometer to about 1000 nanometer.

According to another aspect of the invention, a sheet material is provided which comprises an absorbent material and a cut resistant material attached to the absorbent material. The sheet material exhibits a slice resistance of at least about 30 kgf/cm. In addition, the sheet material will stain after contact with liquid.

Yet still another aspect of the invention includes a method for making a multi-purpose sheet by the steps of forming a web of absorbent fibers, applying a polymeric material of heat bondable particles, heating the web until the polymeric material melts and, finally, allowing the web to cool.

Still other objects of the present invention will become apparent to those skilled in this art from the following description wherein there is shown and described preferred embodiments of this invention, including a best mode currently contemplated for carrying out the invention, simply for the purposes of illustration. As will be realized, the invention is capable of other different aspects and embodiments without departing from the scope of the invention. Accordingly, the drawings and descriptions are illustrative in nature and not restrictive in nature.

Figure 1:
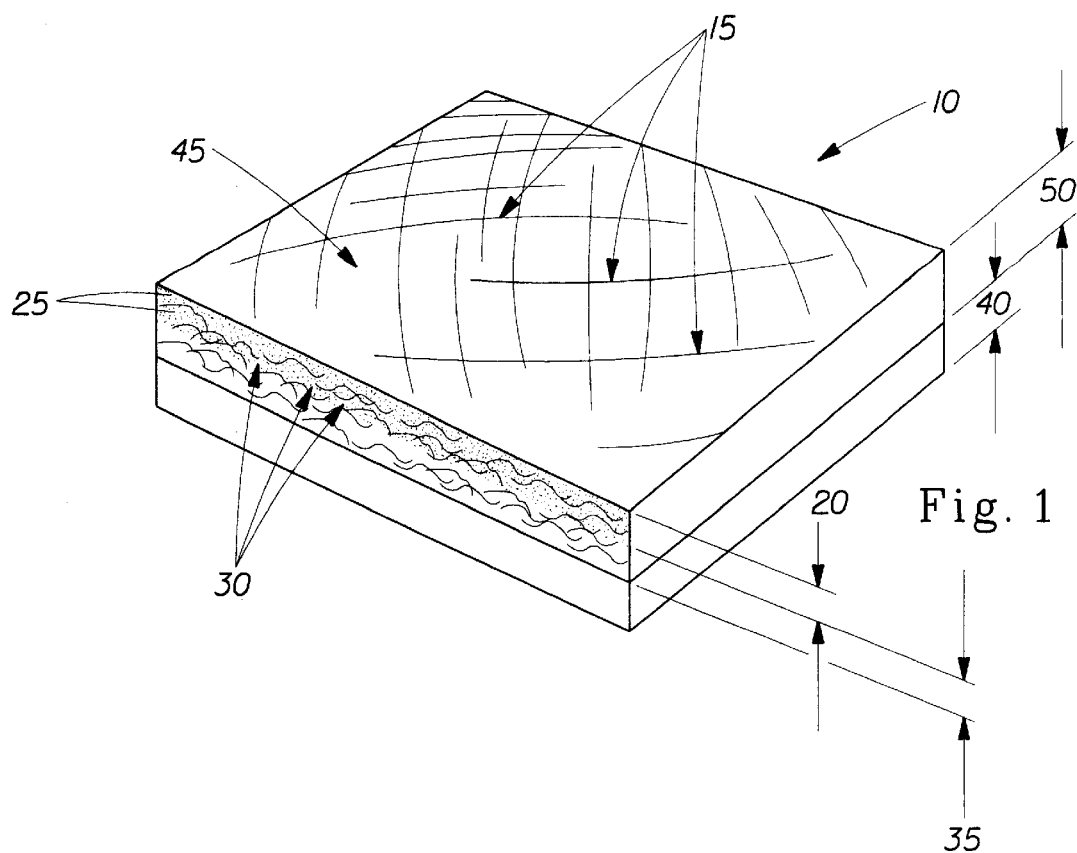
FIG. 1 is a partially segmented perspective view of an exemplary absorbent and shred- and cut-resistant sheet of material, made according to the principles of the present invention.

Turning now to the drawings in detail, wherein like numerals indicate corresponding structure through the views, FIG. 1 is a partially segmented perspective view of an exemplary absorbent and shred- and cut-resistant protective sheet 10 comprised of an absorbent and shred- and cut-resistant layer 50 and a base layer 40. The absorbent and shred- and cut-resistant layer 50 is formed from a unitary fiber 15 web and comprises a shred- and cut-resistant layer of web fiber sheet material 20 containing a discontinuous distribution of heat-bondable polymeric particles 25 and an absorbent layer 35 without polymeric particles 25 according to principles of the present invention. The polymeric particles 25 are discontinuously dispersed and affixed to individual web fibers 15. The absorbent and shred- and cut-resistant layer 50 and the base surface 40 can be attached in any suitable manner, such as by bonding or laminating the absorbent and shred- and cut-resistant layer 50 to the base layer 40, or by casting or extruding the absorbent and shred- and cut-resistant layer 50 to the base layer 40. In this embodiment, the absorbent and shred- and cut-resistant layer 50 includes a cutting surface 45, which is defined by the absorbent and shred- and cut-resistant layer 50 and which remains preferably planar. By keeping the absorbent and shred- and cut-resistant layer 50 planar, food items may be easily cut on this surface without interference from grooves or other structures. The aforementioned heat-bondable polymeric particles 25 typically have an average diameter in the range of from about 100 nanometer to about 1000 nanometer. In a preferred embodiment, the heat-bondable polymeric particles 25 are heat bonded to the web fibers 15 such that the heated polymeric particles form a discontinuous pattern 30 of adhesion with individual fibers 15. This discontinuous bonding pattern 30 of web fiber and polymeric particles 25 will have a discontinuous depth of penetration into the absorbent and shred- and cut-resistant layer 50. In a preferred embodiment about 90% of the total applied polymeric particles 25 migrate into the web and establish themselves within the top 70% of the web fibers 15. More preferably, about 90% of the total applied polymeric particles 25 migrate into the web and establish themselves within the top 40% of the web fibers 15. Yet more preferably, about 90% of the total applied polymeric particles 25 migrate into the web and establish themselves within the top 10% of the web fibers 15.

The web material to form the absorbent and shred- and cut-resistant layer 50 preferably has a relatively high dry basis weight. For example, dry basis weights of in the range of at least about 200 pounds per 3000 ft² to at least about 400 pounds per 3000 ft² are preferred to provide adequate cut-resistance and absorbency. More preferably, the dry basis weight of the absorbent and shred- and cut-resistant layer 50 is in the range of at least about 220 pounds per 3000 ft² to at least about 280 pounds per 3000 ft² and most preferably the dry basis weight of the sheet material is at least about 240 pounds per 3000 ft². Also, the sheet material 20 preferably has a thickness t of from about 250 microns (0.01 inch) to about 1270 microns (0.05 inch) to provide adequate cut-resistance and absorbency. If paper making processes and machinery are used to produce the sheet 20, manufacturing parameters such as material application rate, line speed, amount and duration of pressure applied, etc. can be adjusted to manipulate the basis weight and thickness of the resulting sheet 20.

The absorbent and shred- and cut-resistant layer 50 may be formed from any material or materials suitable for absorbing and/or containing fluids of interest. For example, suitable materials include materials formed from natural fibers, such as cellulosic fibers or refined cellulosic fibers, and/or synthetic fibers, including hollow fibers and capillary channel fibers. As an alternative to or in combination with such fibers, the absorbent and shred- and cut-resistant layer 50 can include an absorbent polymeric foam material, an absorbent polymeric gelling material, a hydrogel material, and/or natural starches and gums, for example. Materials of particular interest include cellulosic substrates, such as paperboard, such as are typically used in paper manufacturing. As described in further detail below, SSK (Southern Softwood Kraft), NSK (Northern Softwood Kraft), or hardwood fibers such as eucalyptus cellulosic fiber fluff can be used to form the absorbent and shred- and cut-resistant layer 50. The absorbent and shred- and cut-resistant layer 50 can alternatively comprise a non-woven substrate, such as can be constructed by entangling synthetic fibers, for instance.

Preferably, the material utilized for the polymeric particles 25 has a low enough melting temperature $T_m$ such that it will soften at temperatures which will not cause the absorbent and shred- and cut-resistant layer 50 to char or burn during the application of heat. Such a material can thereby be bonded to the absorbent and shred- and cut-resistant layer 50 through the application of heat. Such a process increases the shred resistance and cut resistance of the sheet material. It is preferred that the melting temperature of the particles be less than or equal to about 450° F. (280° C.). One preferred material for use in the polymeric particles 25 is polystyrene. Such a material has a good cut and shred resistance and also has a relatively moderate softening point to allow it to be more readily locked into the absorbent and shred- and cut-resistant layer 50 through heat without charring or burning the substrate. Another preferred material for the particles 25 is styrene/butadiene copolymer.

In certain cases, inorganic filler may also be added to the substrate 50 along with the polymeric particles 25 to provide brightness, opacity, or color to the sheet. Suitable fillers include calcium carbonate, talc, titanium dioxide, and mica, for example. In all cases, it is preferred that the absorbent and shred- and cut-resistant layer 50 be substantially free of inorganic free filler particulate. As used herein, the term "free filler particulate" refers to inorganic particles which are not bonded to the absorbent and shred- and cut-resistant layer 50 and which merely reside freely within the absorbent substrate. Such a material may be released from the absorbent and shred- and cut-resistant layer 50 during cutting operations and be mixed with the food items being prepared, potentially making the food undesirable in appearance and/or unsuitable for consumption. It is also preferable that the absorbent and shred- and cut-resistant layer 50 is substantially free of inorganic free filler particulate which is not suitable for contact with food items. By "substantially free" what is meant is an amount no greater than that which would be safe for use of the absorbent substrate in food preparation, or less than an amount in which the filler particulate released during food preparation is noticeable by visual or tactile inspection of the absorbent substrate or food items, or both. By tactile inspection, what is meant is tactile sensory via the hand, or, with respect to food items, the mouth. Notwithstanding the above, the sheet hereof can be substantially free of free filler particulate if it contains unbonded particulate material, but none of the particulate material is releasable when the absorbent sheet is used as intended (i.e., by placing a food item on the side of the sheet intended to be used for cutting, and cutting the food item while it is on this side of the sheet.) Thus, the sheet can be substantially free of filler particulate when it includes unbonded particulate material which is positioned or configured such that little or none is released from the cutting surface during cutting. In particular, it is preferred that at least the cutting surface of the sheet material is shred resistant and exhibits a wet abrasion loss (according to the test described below) of less than about 400 mg per 100 revolutions, and more preferably less than about 300 mg per 100 revolutions. In addition, it is also preferred that the cutting surface of the sheet material exhibits a dry abrasion loss (according to the test described below) of less than about 300 mg per 100 revolutions, and more preferably less than about 200 mg per 100 revolutions.

In this regard, it is preferred that the polymeric particles 25 are provided in an emulsion containing a minimum of about 20.0% and a maximum of about 53.0% total solids. More preferably, the polymeric particles 25 are provided in amounts of about 40.0% total solids, although other concentrations could be used.

It is also preferred that the polymeric particles 25 have an average, pre-heated diameter ranging nominally from about 100 nanometer to about 1,000 nanometer. More preferably, the polymeric particles 25 have an average, pre-heated diameter ranging nominally from about 150 nanometer to about 500 nanometer. Yet more preferably, the polymeric particles 25 have an average, pre-heated diameter ranging nominally from about 180 nanometer to about 220 nanometer. Such emulsion characteristics can be found in an exemplary emulsion manufactured under the name TYLAC® NW-4035 by Reichold, Inc.

Figure 3:
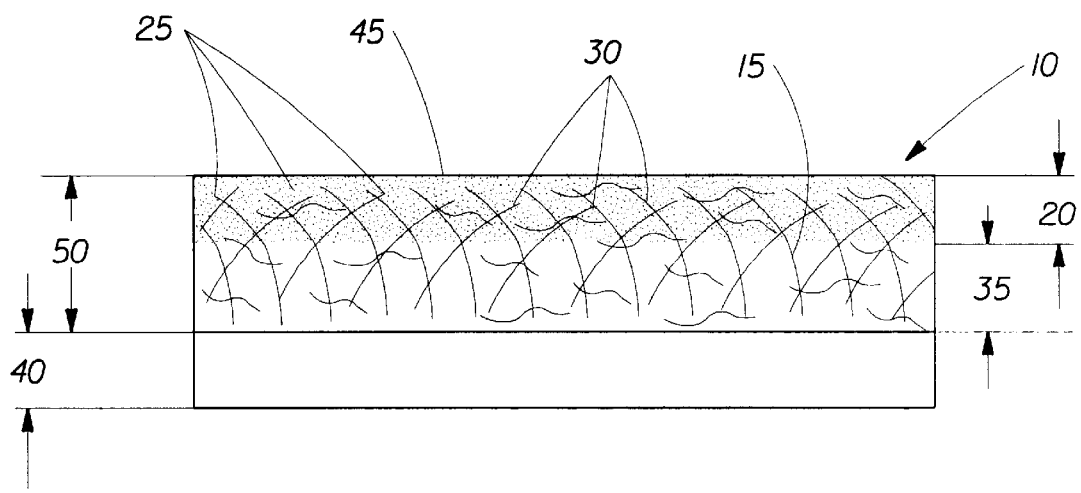
FIG. 3 is a cross sectional view of the exemplary sheet material of FIG. 1.

As also shown in FIGS. 1 and 3, the absorbent and shred- and cut-resistant layer 50 can be combined with one or more similar or differing layers, to produce a layered structure 10 having advantages of the various layers. For instance, as shown in the embodiments of FIGS. 1 and 3, the absorbent and shred- and cut-resistant layer 50 can be attached to a base layer 40 to create a multi-layer sheet 10. The base layer 40 may be formed from any material or materials suitable for attaching as a layer or coating to the absorbent and shred- and cut-resistant layer 50. Non-limiting, suitable materials are known to those skilled in the art and include polymeric films, thermoplastic resins, clay coatings, paperboards or metallic foils. The base layer 40 can comprise one integral layer of material, or a laminate structure having multiple layers of the same or differing composition. The base layer 40 may also have a high coefficient of friction so as to provide skid resistance, or a non-skid surface, to the absorbent and shred- and cut-resistant layer 50. To provide skid resistance, the base layer 40 preferably has a static coefficient of friction of at least about 0.4, and more preferably a coefficient of friction of at least 1 with respect to the support surface (e.g., countertop) to provide a corresponding slip angle of around 45 degrees. In addition, the base layer 40 is preferably fluid impervious to resist the escape of fluid from the absorbent and shred- and cut-resistant layer 50, thereby avoiding contamination of the countertop or supporting surface during use.

Figure 2:
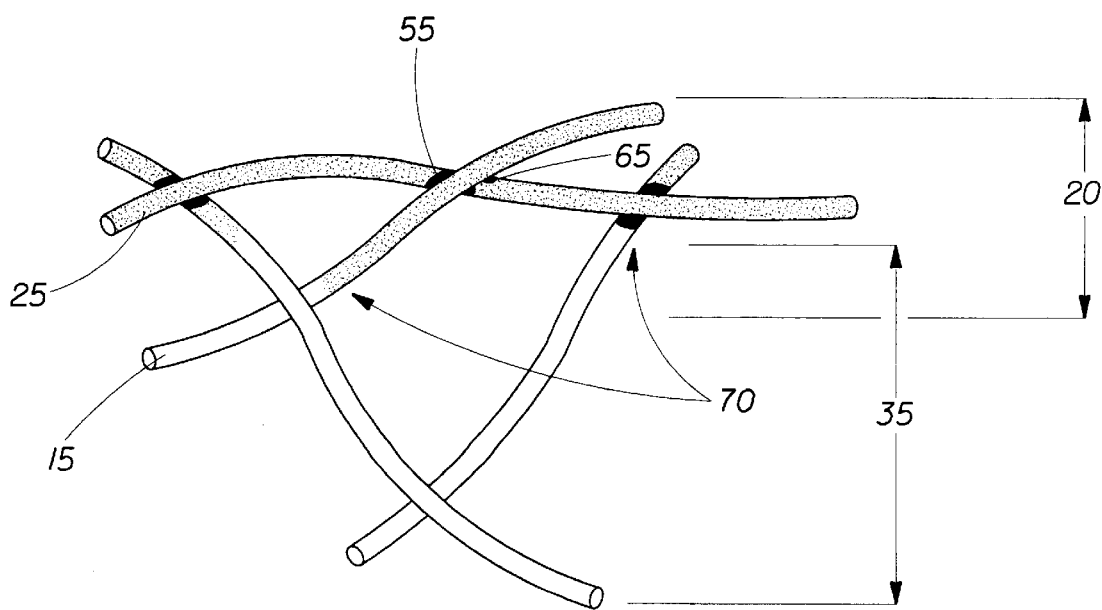
FIG. 2 is a close-up perspective view of the web fibers of an exemplary portion of an absorbent and shred- and cut-resistant sheet of material, made according to the principles of the present invention.

A close-up view of the web 50 at a junction 70 between layer 20 and layer 35 is shown in FIG. 2. The coated layer 20 is shown with polymeric particles 25 discontinuously dispersed on individual fiber members 15 and at exemplary fiber junctions 55 after heat-bonding has occurred. As a preferred, non-limiting embodiment, the polymeric particles 25 have a pre-bonding diameter ranging nominally from about 100 nanometer to about 1,000 nanometer. After heat-bonding, the polymeric particles 25 are then joined to the fibers 15. Additionally, the polymeric particles 25 may either individually 65 or jointly 55 agglomerate at the interstitial fiber joints 75 providing for greater shred resistance.

Furthermore, the polymeric particles 25 are preferably widely and discontinuously distributed throughout the fiber layer 20 to provide good shred resistance to the sheet 10. Alternatively, the polymer particles may be dispersed and widely distributed within defined regions of the fiber layer 20. Exemplary regions may define regular or irregular patterns. Regardless of whether the polymer particles are discontinuously distributed throughout layer 20 or in defined regions of layer 20, the polymer particles 25 are discontinuously dispersed throughout regions of the structure to thereby allow for large areas of the absorbent substrate 50 to be exposed on surfaces 45 to absorb fluid.

FIG. 3 is a cross-sectional view, showing that the absorbent and shred- and cut-resistant layer 50 can be combined with one or more similar or differing layers 40, to produce a layered structure 10 having advantages of the various layers. For instance, as shown in the embodiment of FIG. 3, the sheet material 50 can be attached to a base layer 40 to create a multi-layer sheet 10. The base layer 40 may be formed from any material or materials suitable for attaching as a layer or coating to the sheet 50. Suitable materials include polymeric films, thermoplastic resins, clay coatings, paperboards or metallic foils. The base layer 40 can comprise one integral layer of material, or a laminate structure having multiple layers of the same or differing composition. The base layer 40 may also have a high coefficient of friction so as to provide skid resistance, or a non-skid surface, to the sheet structure 50. To provide skid resistance, the base layer 40 preferably has a static coefficient of friction of at least about 0.4, and more preferably a coefficient of friction of at least 1 with respect to the support surface (e.g., countertop) to provide a corresponding slip angle of around 45 degrees. In addition, the base layer 40 is preferably fluid impervious to resist the escape of fluid from the sheet 50, thereby avoiding contamination of the countertop during use. Thus, the invention provides a laminated structure with a fluid receiving surface and a fluid impervious backing sheet.

The layer 40 can be bonded or laminated to the sheet material 50, extruded or thermo-formed onto the sheet 50, or printed, sprayed, adhered, coated, hot-pressed, or otherwise applied to the sheet 50. For instance, for applying a layer, such as the backing layer 40, to the absorbent and shred- and cut-resistant sheet 50, a hot band press system can be utilized. In addition to be useful for applying the extra layer 40 to the sheet 50, such a hot band press system can also be used for densification of the sheet 50 to further increase its cut-resistance and shred-resistance.

It should be understood that, while the base layer 40 is used in the exemplary implementations shown in FIGS. 1 and 3, it is not necessary to include the base layer. In particular, the sheet material 50 can be utilized alone as a sheet having no base layer. However, it should be understood that any of these embodiments could be provided with such a layer to increase skid resistance and/or resist the escape of fluid from the sheet material 50.

Figure 4:
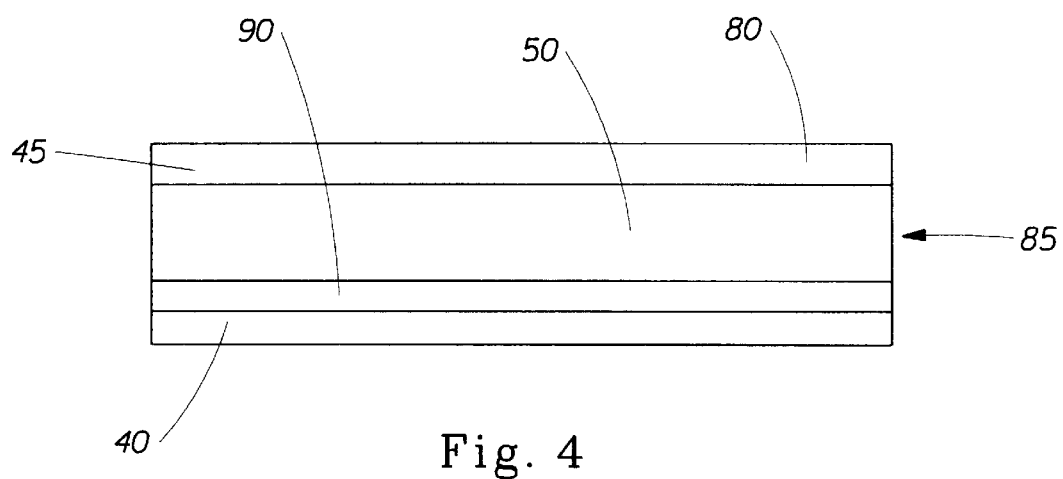
FIG. 4 is a cross sectional view of another embodiment of a layered sheet material made according to principles of the present invention.

FIG. 4 is a general cross-sectional view of a multi-layered structure showing alternatives to the base layer 40, other layers may be provided as well to enhance properties of the sheet 50, or add features thereto. For instance, a top layer may be laminated, coated, bonded, flocked, or otherwise applied to the top surface 45 of the sheet 50, to create a multi-layered sheet structure 85. The top surface 45 can comprise a surfactant to increase the rate of absorption of fluid into the sheet 50. The use of such a surfactant may allow for higher amounts of polymer 25 in the sheet 50 without sacrificing absorbency. Alternatively, the layer can comprise a treatment layer to reduce shredding of the product. Starch, polyvinyl alcohol, or other sizing agents can be utilized for this purpose. The layer can also comprise an application of surfactant, anti-bacterial agent, deodorizing agent, or clay coating. To change the visual appearance of the layered structure 85 or of the sheet 50, a pattern, design, or indicia can be applied thereto. For example, a pattern can be embossed, printed, pressed, or otherwise applied to an exterior surface 45 of the sheet 50 (if used without any additional layers) or to the exterior surfaces of any layer (e.g., layers 80 or 40) which may be applied to the sheet 50.

As also shown in FIG. 4, an additional absorbent layer 90 can be provided between the backing layer 40 and the sheet material 50. The absorbent layer 90 can be formed from any material or materials suitable for absorbing and/or containing the fluids of interest. For example, natural and/or synthetic fibers, absorbent foams, absorbent gelling materials, hydrogels, paper fluff, and other materials could be utilized. Because such an additional absorbent layer 90 can absorb and sequester fluids from the sheet material 50, the sheet 50 can be made less absorbent and more cut and shred resistant by increasing the percentage by weight of particles 25 in the sheet. Moreover, juices produced by the item placed on the top layer 80 can be pulled into the absorbent and shred- and cut-resistant layer 50, thereby spacing the item from the juices.

Figure 5:
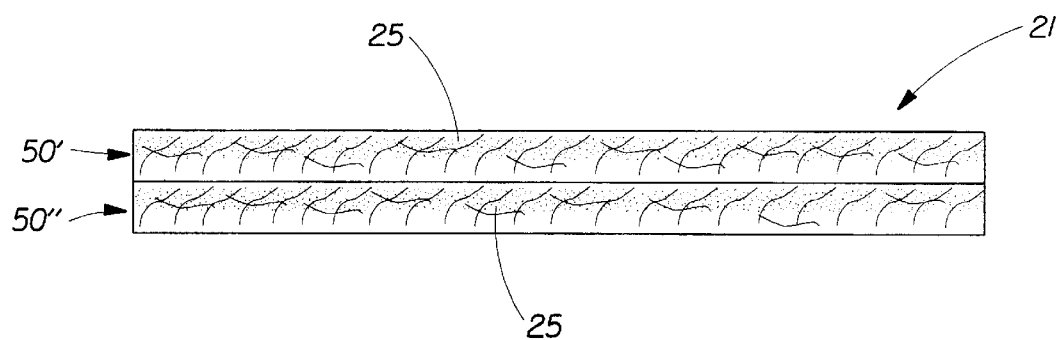
FIG. 5 is a cross sectional view of another embodiment of a layered sheet material made according to principles of the present invention.

FIG. 5 is a cross-sectional view of a multi-layered structure showing that sheet materials 50 such as those of FIG. 1 can be laminated, bonded, or otherwise adhered to like sheet materials 50. Such a configuration of layering two sheet materials 50' and 50" to form a multi-layered sheet 21 is shown in FIG. 5. The resulting layered sheet 21 can have higher shred- and/or cut-resistance when compared to the single sheet materials 50' and 50". In this embodiment, polymeric particles 25 in the sheet 50" are less densely distributed than the polymeric particles 25 of the sheet 50'. Thus, the lower sheet 50" can provide more absorbency than the upper sheet 50', and the upper sheet 50' can provide more shred resistance than the lower sheet 50".

Figure 6:
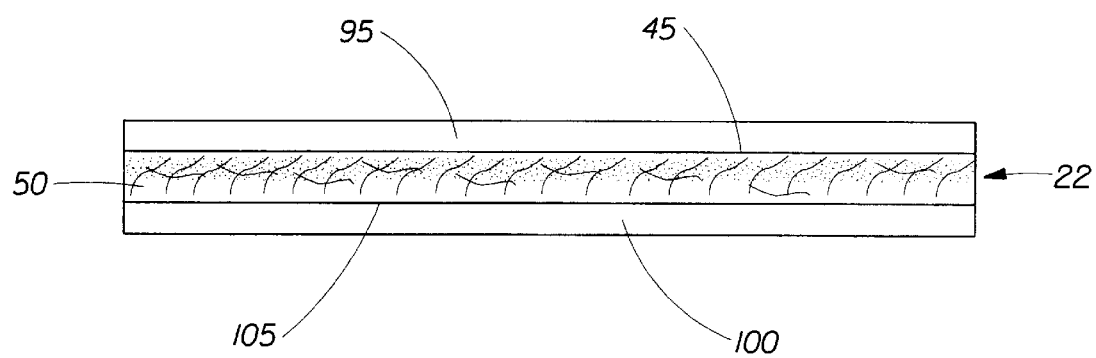
FIG. 6 is a cross sectional view of another embodiment of a layered sheet material made according to principles of the present invention.

FIG. 6 illustrates a cross-sectional view of another alternative layered sheet 22, made according to principles of the present invention. In this embodiment, the layered sheet 22 comprises a top layer 95, a bottom layer 100, and an absorbent and shred- and cut-resistant sheet material 50. As described above, the sheet material 50 includes an absorbent substrate and polymeric particles 25. The substrate 22 and particles 25 can be made from one or more of the exemplary materials described above. For example, the substrate 22 preferably comprises cellulosic material and the particles 25 preferably comprise polymeric material. Also, as noted above, the particles have an average size of at least about 100 nanometers. The basis weight of the sheet 50 is preferably at least 100 pounds per 3000 ft$^2$, and most preferably around 240 pounds per 3000 ft$^2$.

The top layer 95 and bottom layer 100 are preferably free of polymeric particles, and can be made of any material capable of substantially covering the surfaces 45 and 105 of the sheet 50. For example, the top layer 95 and bottom layer 100 can be made from paper, paper-board, paper-like materials, or non-woven materials. Other methods and/or components can be utilized in addition to or as alternatives to use of the layers 95 and 100. The layers 95 and 100 can enhance other properties of the sheet, such as appearance and performance properties for example, after the sheet is manufactured.

The layers 95 and 100 can be bonded or laminated to the sheet material 50, extruded or thermo-formed onto the sheet 50, or printed, sprayed, adhered, coated, pressed, or otherwise applied to the sheet 50. Moreover, the layers 95 and 100 can each comprise one integral layer of material, or a laminate structure having multiple layers of the same or differing composition.

Figure 7:
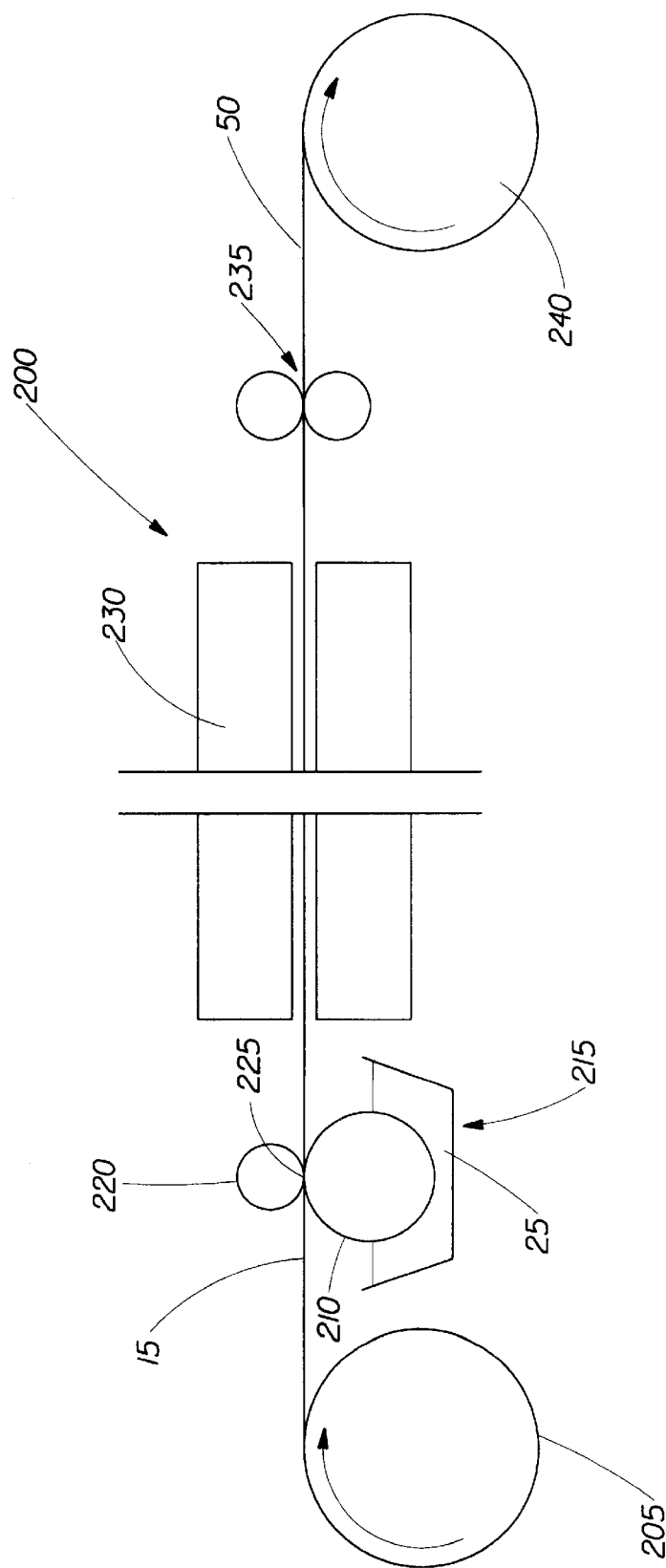
FIG. 7 is a schematic diagram illustrating exemplary equipment and a process that can be used for manufacturing the layered sheet material of FIG. 1; and, FIG. 8 is a schematic diagram illustrating exemplary equipment and a process that can be used for manufacturing the layered sheet material of FIG. 1.
Figure 8:
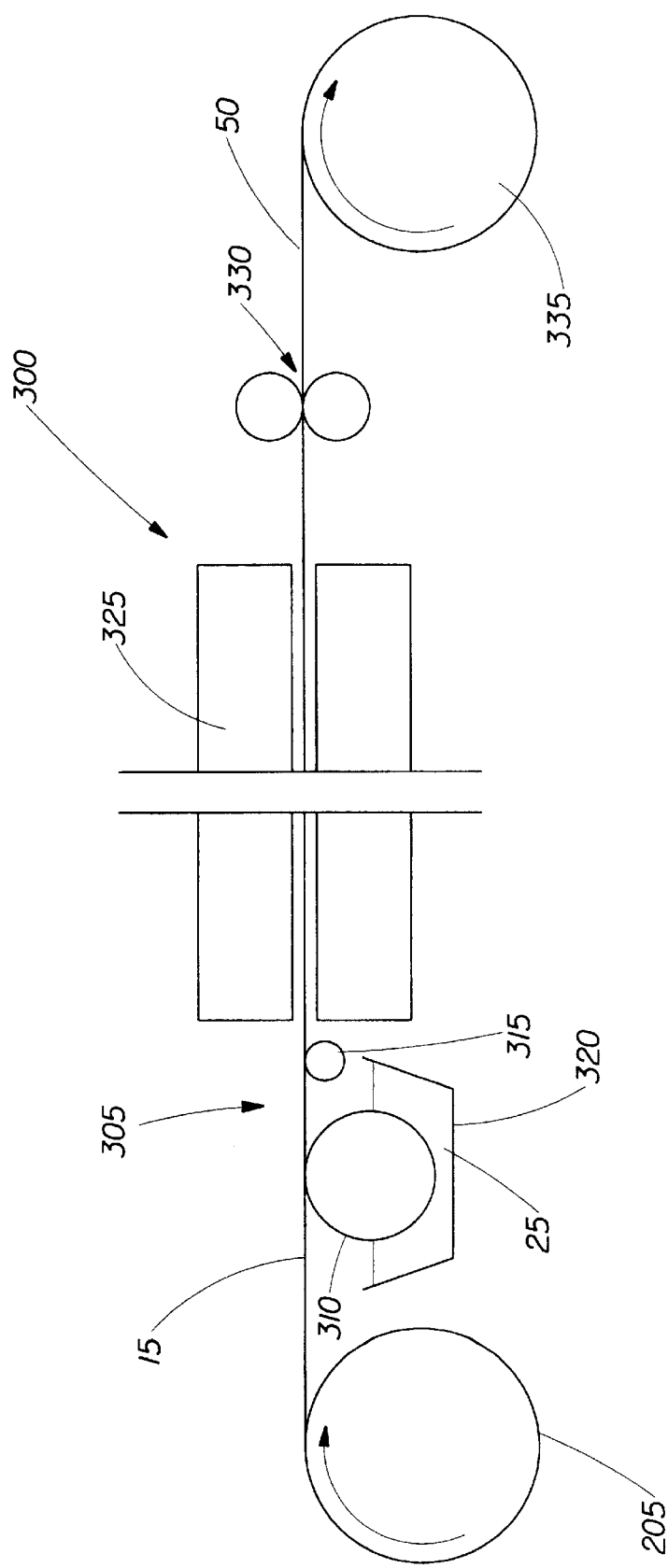

FIGS. 7 and 8 illustrate exemplary equipment and processes for producing the sheet 50 according to principles of the present invention. For example, FIG. 7 is a schematic diagram illustrating exemplary equipment and a process 200 that can be used for manufacturing the layered sheet material of FIG. 1. As shown in FIG. 7, a roll containing web fiber 205 is continuously unwound. A gravure roll 210 is partially contained within a coating pan 215 that contains emulsified polymeric particles 25. Alternatively, an applicator such as a pan, enclosed applicator or pressurized head applies the emulsified polymeric particles 25 to the gravure roll 210. Alternatively, the gravure roll 210 can have a pattern etched within the cells as would be known to one of skill in the art. The emulsion containing the polymeric particles 25 is doctored off the gravure roll flush with the top of the gravure cells and then transferred to the sheet 15. The emulsion of polymeric particles 25 is transferred to the sheet 15 by pressure against the gravure roll 210 from a rubber applicator roll 220. The pressure at the contact point 225 creates a suction and pulls the emulsion from the gravure roll 210 onto the sheet 15. The particles 25 migrate into the sheet by wicking. The coatweight is adjusted by the speed of the gravure roll 210. The coated sheet 50 is then carried through a heat source 230, such as a forced-air convection oven, where water, or solvent, present in the emulsion is evaporated, causing the polymeric particles 25 to bond with the sheet fibers 15 and at interstitial fiber joints 75 as described previously. The treated sheet 50 can then be processed through a nip roller 235 and then either rewound onto a take-up roll 240 or processed immediately into final form as would be done by one skilled in the art of gravure coating.

FIG. 8 is a schematic diagram illustrating yet another exemplary equipment and a process that can be used for manufacturing the layered sheet material of FIG. 1. As shown in FIG. 7, a roll containing web fiber 205 is continuously unwound and introduced to a rod coater 305, consisting of an applicator roll 310, a Meyer rod 315, and a pan 320. An emulsion containing polymeric particles 25 is placed in the pan 320 wherein the applicator roll 310 picks up the emulsion containing polymeric particles 25 and transfers the emulsion to the web substrate 15. The web 15 carries the excess applied emulsion to the Meyer rod 315 where metering occurs to produce the desired coatweight. The coatweight is determined by the size of the Meyer rod 315 as would be known to one skilled in the art. The coated sheet 50 is then carried through a heat source 325, such as a forced-air convection oven, where water, or solvent, present in the emulsion is evaporated, causing the polymeric particles 25 to bond with the sheet fibers 15 and at interstitial fiber joints 75 as described previously. The treated sheet 50 can then be processed through a nip roller 330 and then either re-wound onto a take-up roll 335 or processed immediately into final form as would be done by one skilled in the art of rod coating.

Other non-limiting examples of methods that can be used to practice the invention include die coating, reverse roll coating, flex bar coating, spraying, screen printing, and other typical printing and/or coating processes.

EXAMPLES

The following numbered examples describe non-limiting exemplary sheet materials. Examples 1–7 describe inventive absorbent sheet materials having shred- and cut-resistant particles. All Examples use a solids dispersion of Tylac® 4031 brand polystyrene (Reichhold Corporation) with 1% (by Tylac® solids weight) surfactant added to the dispersion. The tabulated results below show non-limiting exemplary process parameters and exemplary results from these processes.

Example 1

A 40% solids dispersion of Tylac® 4031 (Reichhold Corporation) with 1% (by Tylac® solids weight) surfactant added to the dispersion is applied to a 75/25 softwood/hardwood blend, 320 lb/3000 ft$^2$ paper web. The solution is applied with a #6 Meyer rod. The coated paper web is then passed through a heated, forced-air convection oven to a final web temperature of ~350° F. (177° C.).

Example 2

A 40% solids dispersion of Tylac® 4031 (Reichhold Corporation) with 1% (by Tylac® solids weight) surfactant added to the dispersion is applied to a 100% SSK, 280; lb/3000 ft$^2$ paper web. The solution is applied with a #6 Meyer rod. The coated paper web is then passed through a heated, forced-air convection oven to a final web temperature of ~330° F. (166° C.).

Example 3

A 40% solids dispersion of Tylac® 4031 (Reichhold Corporation) with 1% solids (by Tylac® solids weight) surfactant added to the dispersion is applied to a 75/25 softwood/hardwood blend, 320 lb/3000 ft$^2$ paper web. The solution is applied with a reverse gravure, 45 tri-helical cylinder. The coated paper web is then passed through a heated, forced-air convection oven to a final web temperature of ~340° F. (171° C.).

Example 4

A 40% solids dispersion of Tylac® 4031 (Reichhold Corporation) with 1% (by Tylac® solids weight) surfactant added to the dispersion is applied to a 100% SSK, 280 lb/3000 ft$^2$ paper web. The solution is applied with a reverse gravure, 45 tri-helical cylinder. The coated paper web is then passed through a heated, forced-air convection oven to a final web temperature of ~320° F. (160° C.).

Example 5

A 20% solids dispersion of Tylac® 4031 (Reichhold Corporation) with 1% (by Tylac® solids weight) surfactant added to the dispersion is applied to a 100% SSK, 280 lb/3000 ft² paper web. The solution is applied with a forward gravure, 45 tri-helical cylinder. The coated paper web is then passed through a heated, forced-air convection oven to a final web temperature of 350° F. (177° C.).

Example 6

A 10% solids dispersion of Tylac® 4031 (Reichhold Corporation) with 1% (by Tylac® solids weight) surfactant added to the dispersion is applied to a 100% SSK, 280 lb/3000 ft² paper web. The solution is applied with a forward gravure, 45 tri-helical cylinder. The coated paper web is then passed through a heated, forced-air convection oven to a final web temperature of 340° F. (171° C.).

Example 7

A 40% solids dispersion of Tylac® 4031 (Reichhold Corporation) with 1% (by Tylac® solids weight) surfactant added to the dispersion is applied to a 100% SSK, 280 lb/3000 ft² paper web. The solution is applied with a 110 tri-helical cylinder. The coated paper web is then passed through a heated, forced-air convection oven to a final web temperature of ~350° F. (177° C.).

Test Methods

The following test methods are utilized for characterizing sheets made according to EXAMPLES 1–7:

Absorbency Rate
1) A 36 in² (6 in. by 6 in.) (232.26 cm²) sample is weighed and placed directly under a Buret.
2) 10 cc of distilled water is dispensed from the Buret onto the sample.
3) The water is permitted to absorb for 30 seconds. (If all water is absorbed prior to 30 seconds, record the time of absorption for later calculations.)
4) At 30 seconds, the sample is tapped 10 times on its side, removing any non absorbed water.
5) Weigh the sample and record the weight.
6) Calculate the absorbency rate as (final weight−initial weight)/time. The units are $$\frac{g_{water}}{s}.$$

7) Calculate the unit absorbency rate as ((final weight−initial weight)/time)/sample area. The units are $$\frac{g_{water}}{s \cdot cm^2}.$$

8) Test 3–5 samples per above.
9) Report average of sample values.

Absorbent Capacity
1) A 16 in² (4 in. by 4 in.) (103.22 cm²) sample is weighed and placed into a container of distilled water, completely submerged.
2) The sample remains completely submerged for 120 seconds.
3) At 120 seconds, the sample is removed from the water and permitted to drip dry for 30 seconds.
4) At the completion of the 30 second drip dry, the sample is shaken 1 time to remove residual water.
5) Weigh the sample and record the weight.

6) Calculate the capacity as (final weight−initial weight)/sample area. The units are $$\frac{g_{water}}{cm^2}$$

7) Test 3–5 samples per above.
8) Report average of sample values.

Absorbent Efficiency
1) Calculate the absorbent efficiency as:

$$Efficiency = \frac{Capacity \cdot Rate}{thickness} * 10^4$$

Slice Testing (Slice or Cut Resistance)
The test apparatus described applies a known force in the z (vertical) direction on a knife blade to measure the cut resistance of a sample. A knife blade is placed in the knife holder. The knife blades used for all testing are Poultry Blades Code #88-0337 by Personna. The test sample is mounted to a sample platform. The knife blade is then brought into contact with the sample. A known load is applied to the knife blade in the vertical direction. The sample platform is then moved at a rate of 8 inches per second for 4 inches under the weight of the knife blade creating a slice. Consecutive slices of increasing load are made until the knife blade cuts through the sample. The knife force required to penetrate completely through the sample is recorded. Slice resistance is calculated as the slice force/sample thickness. Replicate test on 3–5 separate samples and report average values.

Shredding Tests (Abrasion Loss)
The following abrasion loss test methods are adapted from TAPPI standard T476om-97 and utilized to characterize the shredding resistance of SAMPLES 1–6 described above.

Taber Abrasion Loss Test (Dry)
1. Cut 4 inch×4 inch square sample with a ¼ inch hole in the center.
2. Mount Catalog No. H-18 TABER® abrasion wheels on TABER® abraser tester. Mount 1000 g weights on parallel arms of TABER® tester.
3. Weigh sample to three decimal points.
4. Mount sample in specimen holder of TABER® tester. Lower the arms and start the turntable. Allow rotation for 100 revolutions at a rotation speed of approximately 70–75 RPM.
5. Remove the sample. Tap the sample on its side to remove any loose fibers on the surface. Weigh the sample to three decimal points.
6. Calculate the unit abrasion loss as (initial weight−final weight). The units are $mg_{material\ lost}$/100 revolutions.
7. Test three–five samples per above.
8. Report average of sample values.

Taber Abrasion Loss Test (Wet)
1. Cut 4 inch×4 inch square sample with a ¼ inch hole in the center.
2. Mount Catalog No. H-18 TABER® abrasion wheels on TABER® abraser tester. Mount 1000 g weights on parallel arms of taber tester.
3. Weigh sample to three decimal points.
4. Soak sample in distilled water for thirty seconds.
5. At 30 seconds, the sample is removed from the water and tapped ten times on its side in order to remove any non-absorbed water.
6. Mount sample in TABER® tester. Lower the arms and start the turntable. Allow rotation for 100 revolutions.
7. Remove the sample. Place sample in 140° F. oven to dry overnight. The samples are removed the next day and allowed to condition in the original environment for at least four hours.
8. Weigh the conditioned sample to three decimal points.
9. Calculate the unit abrasion loss as (initial weight–final weight). The units are mg$_{material\ lost}$/100 revolutions.
10. Test three–five samples per above.
11. Report average of sample values.

Results

The following table shows the characteristics of the sheets formed in Examples 1–7.

| Example | Run # | Avg. Paper Temp (F.) | Caliper (in) | Solids Add-on (g/m$^2$) | Abs. Rate (g/s) | Wet Taber (mg/100 rev) |
|---|---|---|---|---|---|---|
| 1 | 9  | 348 | 0.026 | 46.7 | 0.041 | 162 |
| 2 | 11 | 327 | 0.025 | 74.6 | 0.052 | 198 |
| 3 | 8  | 341 | 0.027 | 63.2 | 0.049 | 227 |
| 4 | 2  | 323 | 0.023 | 27.0 | 0.058 | 245 |
| 5 | 5  | 346 | 0.024 | 16.2 | 0.056 | 261 |
| 6 | 6  | 336 | 0.025 | 22.6 | 0.081 | 310 |
| 7 | 9  | 351 | 0.023 | 14.6 | 0.056 | 236 |

The foregoing examples and descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, systems, configurations, methods, and potential applications have been described, it should be understood that many variations and alternatives could be utilized without departing from the scope of the invention.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Accordingly, it is intended that such modifications fall within the scope of the invention as defined by the claims appended hereto.

What is claimed is:

1. A multi-purpose sheet material comprising:
   (a) a web of absorbent fibers, said web having a polymer containing layer;
   (b) wherein said polymer containing layer comprises discontinuous heat bonded particles having an average diameter of from about 100 nm to about 1000 nm;
   (c) wherein said web comprises of from about 0.5 g/m$^2$ to about 75 g/m$^2$ of said heat bonded particles; and,
   (d) wherein said web has a dry basis weight of from about 200 lb/3000 ft$^2$ to about 400 lb/3000 ft$^2$.

2. A multi-purpose sheet material as in claim 1, wherein said heat bonded particles are from about 150 nm average diameter polymeric material to about 500 nm average diameter polymeric material.

3. A multi-purpose sheet material as in claim 1, wherein said heat bonded particles are from about 180 nm average diameter polymeric material to about 220 nm average diameter polymeric material.

4. A multi-purpose sheet material as in claim 1, wherein said dry basis weight is from about 220 lb/3000 ft$^2$ to about 280 lb/3000 ft$^2$.

5. A multi-purpose sheet material as in claim 1, wherein said web comprises of from about 5 g/m$^2$ to about 20 g/m$^2$ of polymeric material.

6. A multi-purpose sheet material as in claim 1, wherein said web comprises of from about 7 g/m$^2$ to about 15 g/m$^2$ of polymeric material.

7. A multi-purpose sheet material as in claim 1, further comprising:
   (e) a substantially fluid impervious base layer substantially continuously covering the side opposite said polymer containing layer.

8. A multi-purpose sheet material as in claim 1, wherein said sheet material exhibits an absorbent efficiency of at least 0.2 and a slice resistance of at least 30 kgf/cm.

9. A multi-purpose sheet material as in claim 1, wherein said web of absorbent fibers comprises an absorbent layer.

10. A multi-purpose sheet material as in claim 1, wherein said sheet material has a slice resistance of at least 40 kgf/cm.

11. A multi-purpose sheet material as in claim 1 wherein said polymer containing layer is formed by application of an emulsion containing heat bondable particles.

12. A method for making a multi-purpose sheet comprising the steps of:
   (a) forming a web of absorbent fibers, said web comprising fibers with a dry basis weight of from about 200 lb/3000 ft$^2$ to about 400 lb/3000 ft$^2$;
   (b) applying a polymeric material to said web, said polymeric material comprising heat bondable particles having an average diameter of from about 100 nm to about 1000 nm;
   (c) heating said web until said polymeric material melts; and,
   (d) cooling said web.

13. A method for making a multi-purpose sheet as claimed in claim 12 further comprising the step of:
   (e) covering the side opposite said polymer containing layer with a substantially fluid impervious base layer.

14. A multi-purpose sheet prepared by the method of claim 12 which comprises:
   (a) forming a web of absorbent fibers, said web comprising fibers with a dry basis weight of from about 200 lb/3000 ft$^2$ to about 400 lb/3000 ft$^2$;
   (b) applying a polymeric material deposited on said web, said polymeric material comprising heat bondable particles having an average diameter of from about 100 nm to about 1000 nm;
   (c) heating said web until said polymeric material melts; and,
   (d) cooling said web.

* * * * *